(12) United States Patent
Meyers

(10) Patent No.: US 9,441,660 B2
(45) Date of Patent: Sep. 13, 2016

(54) MOUNTING INSERT AND METHOD

(71) Applicant: John Meyers, Hamburg (DE)

(72) Inventor: John Meyers, Hamburg (DE)

( * ) Notice: Subject to any disclaimer, the term of this patent is extended or adjusted under 35 U.S.C. 154(b) by 0 days.

(21) Appl. No.: 14/700,903

(22) Filed: Apr. 30, 2015

(65) Prior Publication Data

US 2015/0362005 A1  Dec. 17, 2015

(30) Foreign Application Priority Data

Jun. 17, 2014  (DE) .......................... 10 2014 108 547

(51) Int. Cl.
| | | |
|---|---|---|
| F16B 1/00 | (2006.01) | |
| F16B 21/00 | (2006.01) | |
| B32B 37/14 | (2006.01) | |
| B32B 3/12 | (2006.01) | |
| B32B 5/18 | (2006.01) | |
| B32B 7/12 | (2006.01) | |
| B32B 37/12 | (2006.01) | |
| B32B 38/04 | (2006.01) | |

(52) U.S. Cl.
CPC ................. F16B 21/00 (2013.01); B32B 3/12 (2013.01); B32B 5/18 (2013.01); B32B 7/12 (2013.01); B32B 37/146 (2013.01); B32B 37/12 (2013.01); B32B 2038/047 (2013.01); B32B 2250/40 (2013.01); B32B 2266/025 (2013.01); B32B 2305/024 (2013.01); B32B 2305/34 (2013.01); B32B 2307/51 (2013.01); B32B 2479/00 (2013.01); B32B 2605/12 (2013.01); B32B 2605/18 (2013.01)

(58) Field of Classification Search
CPC .............. F16B 9/02; F16B 5/01; F16B 3/30; F16B 3/12; F16B 3/02; Y10T 29/49966

USPC ....... 52/787.1, 125.5, 742.1, 742.12, 742.14, 52/745.21; 411/171, 82, 82.1; 29/460; 156/293, 256, 257, 66; 264/273–274
See application file for complete search history.

(56) References Cited

U.S. PATENT DOCUMENTS

| | | | | |
|---|---|---|---|---|
| 3,019,865 A | * | 2/1962 | Rohe ......................... | F16B 5/01 411/82 |
| 3,282,015 A | * | 11/1966 | Rohe ....................... | B29C 65/42 411/258 |
| 3,339,609 A | * | 9/1967 | Cushman .................. | B64C 1/12 249/93 |
| 3,384,142 A | * | 5/1968 | Phelan ...................... | F16B 5/01 29/432 |

(Continued)

FOREIGN PATENT DOCUMENTS

| | | |
|---|---|---|
| DE | 14 00 888 | 11/1968 |
| DE | 14 00 886 | 12/1968 |
| DE | 28 34 237 | 9/1979 |

*Primary Examiner* — Beth Stephan
(74) *Attorney, Agent, or Firm* — Sand & Sebolt

(57) ABSTRACT

A method for Inserting and fixing a mounting insert into a lightweight sandwich panel. The panel comprises a core layer and two cover layers that are applied to opposing main surfaces of the panel. A recess extends into the depth of the core layer of the panel. The mounting insert is inserted into the recess and is adhesively bonded therein. The bottom of the recess extends to a depth of the core layer material that extends further than the longitudinal extension of the recessing section to be inserted. When adhesively bonding the mounting insert, an air gap remains between an end face of the recessing section and the bottom of the recess. No adhesive is placed into the air gap. The air gap ensures a decoupling so that any applied tensile forces are no longer transferred to the cover layer opposite and the undesired formation of dents is avoided.

13 Claims, 7 Drawing Sheets

(56) References Cited

U.S. PATENT DOCUMENTS

| | | | | |
|---|---|---|---|---|
| 3,392,225 A * | 7/1968 | Phelan | B64C 1/12 | 241/93 |
| 3,417,803 A * | 12/1968 | Rohe | B29C 65/42 | 411/166 |
| 3,434,261 A * | 3/1969 | Rohe | F16B 5/01 | 411/116 |
| 3,526,072 A * | 9/1970 | Campbell | F16B 5/01 | 29/452 |
| 3,884,006 A * | 5/1975 | Dietlein | B23P 19/062 | 411/360 |
| 4,093,491 A * | 6/1978 | Whelpton | B29C 65/18 | 156/293 |
| 4,212,610 A * | 7/1980 | Weidlich | F16B 5/01 | 244/131 |
| 4,729,705 A * | 3/1988 | Higgins | F16B 5/01 | 411/174 |
| 4,817,264 A * | 4/1989 | Worthing | B29C 66/7392 | 29/512 |
| 4,973,208 A * | 11/1990 | Gauron | B29C 70/68 | 411/258 |
| 5,240,543 A * | 8/1993 | Fetterhoff | F16B 5/01 | 156/293 |
| 5,536,344 A * | 7/1996 | van Dreumel | B29C 65/0672 | 156/257 |
| 5,823,729 A * | 10/1998 | Nagayama | B21D 53/24 | 411/427 |
| 6,138,980 A * | 10/2000 | Farbotnik | F16B 5/0258 | 248/634 |
| 6,264,412 B1 * | 7/2001 | Nakamura | F16B 5/01 | 411/107 |
| 6,394,722 B1 * | 5/2002 | Kunt | F16B 5/0241 | 411/172 |
| 6,497,082 B1 * | 12/2002 | Toyoda | B29C 70/865 | 156/66 |
| 6,898,918 B2 * | 5/2005 | Eshraghi | F16B 19/1063 | 156/293 |
| 8,584,433 B2 * | 11/2013 | Masuda | F16B 5/01 | 411/82.1 |

* cited by examiner

MOUNTING INSERT AND METHOD

BACKGROUND OF THE INVENTION

1. Technical Field

The present invention concerns a method for inserting and fixing a mounting insert with a recessing section by means of an adhesive bonding technique into a lightweight sandwich panel comprising a core layer and two cover layers that are attached to the opposing main surfaces of the core layer. Moreover, the application concerns a mounting insert for installation into a lightweight sandwich panel.

2. Background Information

It is known per se to use lightweight sandwich panels for lining applications, for building furniture and other similar tasks. This technology is used especially in applications where saving weight is of great interest, particularly in the construction of aircraft for the building of interior furnishings and the lining of aircraft, but also in the boat building industry for fitting out boats and ships. In these instances the use of lightweight sandwich panels excels particularly since they are low in weight through the use of lightweight core layers or core panels respectively, which often come in a honeycomb structure, but through the particular construction of said core layer or core panel respectively and the firm connection with the cover panels they still provide sufficient strength to be able to make sufficiently robust and durable or strong installations, for example furnishings or lining.

To be able to combine more complex shapes made from such lightweight sandwich panels, for example furniture such as cabinets or shelving, the panels must be connected to each other in many different ways. To achieve this, mounting inserts are inserted into the lightweight sandwich panels, which are often provided with internal threads into which matching screws are fixed that are connected to another lightweight sandwich panel or another component.

Such mounting inserts are often designed in the form of a sleeve, or they have an internal thread in the form of a blind hole. To insert and fix these mounting inserts in the lightweight sandwich panels, corresponding recesses are provided in the lightweight sandwich panel, the mounting inserts are inserted and fixed with an adhesive. Examples for this are provided in documents DE-OS 14 00 888, DE 14 00 886 A and DE 28 34 237 B1.

The methods for inserting and fixing a mounting insert, using the methods described in said documents, have in common that a borehole is formed in a lightweight sandwich panel, where said borehole passes through the cover layer and into a core layer, which in the examples described is in the form of a honeycomb structure. The mounting insert is placed into said borehole. The mounting insert is adhesively bonded in that the entire space of the borehole that surrounds the mounting insert is filled with an adhesive or a casting resin respectively, which, in the sense of the invention, also constitutes an adhesive. In the method known per se, said adhesive also penetrates in part into the existing honeycomb structure and is able to flow up to the opposite cover layer.

Although the known methods achieve the aim of securely fixing the mounting insert in the lightweight sandwich panel, problems are observed with mounting inserts that are fixed according to the known methods, and with the lightweight sandwich panels that are fitted with said mounting inserts, the cause of which has not been found so far, nor has the problem been solved in a satisfactory manner.

When a fastener is engaged in such a mounting insert, for example a screw is inserted into the internal thread of such a mounting insert for the purpose of, for example, fastening two lightweight sandwich panels to each other, a tensile force is applied via said screw in the direction of the cover layer through which the mounting insert is inserted, and an indentation appears on the side opposite to that side of the lightweight sandwich panel into which the fastener, e.g., the screw, was inserted, thus causing a concave dent in the opposite cover layer in the vicinity of the mounting insert. Said dents are visually detracting, particularly in areas where the respective lightweight sandwich panel is exposed. To correct these defects, the dents that have formed are still manually reworked in a time-consuming manner in that a transparent or colored paint is applied to fill said dents, thus retouching them. This manual rework is not only elaborate and costly, the retouching of the defects is usually insufficient and the faults are not completely corrected.

SUMMARY

The inventor has considered this problem, and the prevention of such defects, and has made it his objective to provide an improved mounting technique. The inventor recognized that the reason for the formation of dents lies in the manner in which the mounting inserts are inserted and fixed in the prior art. As a result the inventor searched for an improved method for the inserting and fixing of a mounting insert that features a recessing section, and has, moreover, made it his objective to provide an improved design of a mounting insert that can be used in conjunction with an improved method.

In this respect the inventor initially recognized that the essential reason for, and effect of, the formation of dents, as described above, lies in the fact that a tensile force that is applied in direction transverse to the thus fixed mounting insert, and in particular perpendicular to the cover layer through which the mounting insert was inserted, and is transmitted through the adhesive, which fills the recess completely, up to the opposite side of the core layer, and from there to the cover layer that is attached to it, and so leads to the deformation of the lightweight sandwich panel across its entire structural depth and finally to the formation of dents. The inventor recognized that this effect occurs not only when the adhesive, which fills the recess, is present throughout the entire depth of the lightweight sandwich panel up to the opposite cover layer, but also when said adhesive attaches firmly to the remaining structures of the core panel, for example to the web of the honeycomb structure, in continuation of the longitudinal direction and depth, and thus transmits, via said structures, a corresponding tensile force to the opposite side and to the cover layer of the lightweight sandwich panel in this location.

The inventor was able to prevent the problem that causes the undesired effect of the formation of dents by inserting and fixing mounting inserts in lightweight sandwich panels by means of an adhesive bonding technique, in which said lightweight sandwich panel comprises a core layer and two cover layers that are applied to each other opposing main surfaces of said lightweight sandwich panel, in which through the removal of material a recess is provided that extends into the depth of the core layer and into which the mounting insert is inserted and fixed by means of adhesive bonding, characterized in that the bottom of the recess extends to a depth of the core layer material that extends further than the longitudinal extension of the recessing section to be inserted, but in which the recess does not fully penetrate the core layer, and that, when adhesively bonding the mounting insert, an air gap remains between an end face of the recessing section that points towards the bottom of the recess and the bottom of the recess, and where no adhesive is placed into the air gap. In this respect this method meets the objective described above. Further embodiments and advantageous further developments include providing the mounting insert with a support section that has a lateral extension in a transverse direction, transverse to the longitudinal extension of the recessing section, which is greater than an extension of the recessing section in the transverse direction, and which is also greater than the extension of the recess in said transverse direction, and that the support section is surface-bonded to a surface of the core layer or to a surface of one of the cover layers. Furthermore, the method includes forming the recess in the core layer and adhesively bonding the mounting insert to the core layer before a cover layer is applied to that main surface of the core layer from which the recess has been formed, and that, subsequently, the cover layer is applied to that main surface of the core layer into which the recess has been formed and the mounting insert has been placed, and is bonded to the core layer. The core layer has a honeycomb structure. Furthermore, prior to forming the recess in a first step through removing material of the lightweight sandwich panel, an opening is made, the dimensions of which are greater than those of the recess to be formed, where said opening is subsequently filled with a filler material that abuts the material of the lightweight sandwich panel and bonds to the structures of the lightweight sandwich panel that bound the opening, and the recess is subsequently formed in said filler material. Additionally, the filler material used is a porous curing material. A particularly suitable mounting insert specifically designed with the characteristics of with a recessing section for the recessed insertion into a recess in a structure of the lightweight sandwich panel, in which the recessing section has a longitudinal extension in a first direction and where, continuing from said recessing section, a collar is formed in the direction of longitudinal extension, delimiting a first end face that is shaped as a circumferential, plate-like collar that extends in a transverse direction transverse to the longitudinal extension, especially perpendicular to it, which overhangs the recessing section that adjoins the collar characterized in that the extension of the collar in transverse direction is at least 1.5 times the extension of the recessing section in transverse direction, and that the recessing section is provided in the direction of a second end face, which is located opposite the first end face, with a uniform extension in transverse direction, or it tapers in that direction, and ends there without further increase or ends with a heel, the extension of which in transverse direction is at most 1.2 times the extension of the recessing section in transverse direction. Further developments of the same which can also be implemented separately from such a mounting insert described above and thus in an independent embodiment so as to obtain a suitable mounting insert for the implementation of the method according to the invention. The mounting insert includes a recessing section provided with an internal thread that is oriented with its thread axis in the direction of longitudinal extension, and is accessible from the first end face. The internal thread is formed in a threaded part inside the mounting space, itself formed inside recessing section, and where said threaded part is arranged moveable relative to the recessing section inside mounting space transverse to the direction of the longitudinal extension. The mounting insert includes an elastic cushioning element that is disposed between the threaded part and a wall of mounting space, which delimits the mounting space in the direction of longitudinal extension. A vent hole is located in the base of the mounting space. The mounting insert further includes at least one, preferably multiple, radially offset through hole(s) that are provided in the collar on the other side of the recessing section. The recessing section takes the form of a circular cylinder, and that the collar is circular and plate-like. The recessing section has a greater length in a first transverse direction, which extends transverse to the direction of the longitudinal extension, than in a second transverse direction that extends transverse to the direction of the longitudinal extension and transverse to the first transverse direction.

The special feature of the method according to the invention for inserting and fixing a mounting insert with a recessing section into a lightweight sandwich panel, comprising a core layer and two cover layers, which are attached by adhesive means to the opposing main sides of said lightweight sandwich panel, is that in this method the recess, which extends into the depth of the core layer through removing material but does not go through fully, into which the mounting insert with its recessing section is inserted and adhesively fixed, extends to a depth of the material of the core layer that extends further than the length of the recessing section to be inserted into the recess, and that, furthermore, when adhesively fixing the mounting insert, a gap is maintained between the end face of the recessing section that faces the bottom of the recess, and the bottom of the recess itself, into which no adhesive extends. This measure causes a decoupling of the positive connection of the mounting insert via the adhesive from the remaining depth of the lightweight sandwich panel. In particular, the positive coupling up to the opposite cover layer present in the prior art is thus removed, and a decoupling via the air gap is provided. If now a tensile force, which acts across the cover layer through which the mounting insert has been inserted into the material of the lightweight sandwich panel or, respectively, below which the mounting insert has been inserted into the structure of the core layer, is applied to a mounting insert that has been inserted and fixed in this manner, a minor deformation of the structure of the lightweight sandwich panel surrounding the insert may occur, but this deformation is not transmitted to the opposite cover layer. An interruption occurs in the air gap, which enlarges due to the deformation, but beyond said air gap the form and structure of the lightweight sandwich panel remains unchanged, and in particular there is no formation of an unsightly or undesired dent. In particular, this "barrier", at which the force cannot be transmitted further in a linear manner, in opposite direction to the tensile force, due to the decoupling as a result of the air gap, causes a diversion of the force into the plane of the lightweight sandwich panel. The flow of force achieved this way does not cause the formation of dents as is observed in the solutions according to the prior art.

The decoupling described above, which is deliberately and specifically achieved by the remaining air gap, represents the core aspect of the solution according to the invention through which the formation of dents can be prevented.

An air gap of this kind can be achieved, for example, in that the corresponding mounting insert comprises a heel at its front end that is inserted into the recess, where said heel is dimensioned such that it forms a tight seal with the surrounding edge of the recess so that the gap that is filled with adhesive only extends from above said heal to the opening of the recess. This space is then filled with adhesive, thus ensuring that an air gap remains below the heel of the front face of the mounting insert formed there, or rather its recessing section, and the deeper formed recess, which causes the described decoupling.

In the method according to the invention in particular, prior to the actual forming of the recess into which the mounting insert is to be inserted, an opening can be made initially that extends into the core layer but, notably, does not fully penetrate said core layer, in that material of the corresponding structure(s) of the lightweight sandwich panel is removed. This opening is wider than the planned recess. In this process said opening is then filled with a filler material, which attaches to the structures of the lightweight sandwich panel that form the boundary to the opening, and is thus anchored in the opening. The actual recess, which is formed as a blind hole, is then formed into the filler material, and when inserting the mounting insert, the air gap according to the invention between the base of the recess formed into the filler material and the front end of the recessing section that is facing said base is formed by making the recess into the filler material sufficiently deep.

In this instance the filler material acts as an anchor, providing a further improved anchoring of the mounting insert. The filler material may, in particular, be a porous curing material, for example curing foam such as PU foam. Such a porous curing material has the advantage that, when later fixing the mounting insert by means of the adhesive, the adhesive enters into the pores of the filler material and thus can ensure a particularly firm grip. It is self-evident that the recess in the curing filler material can only be formed after it is cured. This is achieved in that some of this material is removed, for example, through drilling or milling.

A particular advantage of the above described process concerning the initial application of a filler material into an opening made into the material of the lightweight sandwich panel and the provision of the recess into this filler material lies in the fact that in this way a recess with a well-defined cross-section, for example a circular cross-section, can also be provided in the core layer, which is characterized by a high air content, for example in the form of a honeycomb structure. For example with a heel as described above it is possible to provide a seal, or end stop respectively, along the entire circumference of the recessing section for the adhesive that penetrates the annular gap between the recessing section and the surrounding edge of the recess. Said sealing effect could otherwise not always be achieved if the mounting insert was simply inserted directly into a recess that has been provided in the material of the lightweight sandwich panel, being dependent particularly on the structure of the core layer.

Alternatively, or in addition to providing a heel on the recessing section, it is also particularly possible to use a mounting insert that is provided with a support section, which has a lateral extension that extends transverse to the longitudinal extension of the recessing section, the lateral extension of which is greater than the extension of the recessing section in transverse direction, and is also greater than the extension of the recess in this transverse direction. In this advantageous further development of the method according to the invention, the surface of said support section is adhesively bonded with a surface of the core layer or a surface of the cover layers. With this approach an additional effect is utilized that further suppresses the formation of dents. As a result of the adhesive bonding of the surface of the support section with the surface of the core layer or one of the cover layers it is possible, in addition to the decoupling of the tensile force acting in longitudinal direction of the recessing section achieved by the remaining air gap, to achieve a redirection of at least part of said tensile force into a direction transverse to the longitudinal direction, and in particular parallel to the surface of the core layer, or the cover layer respectively, with which the support section is adhesively bonded. Thus the tensile force in longitudinal direction of the recessing section is reduced, which also reduces the tendency towards the formation of dents since the force that is to be decoupled via the air gap is reduced.

It is fundamentally possible to provide the recesses, into which the mounting insert with its recessing section is inserted, in the lightweight sandwich panel when it is completely assembled and laminated. This means that the recess can be provided through the applied cover layer into the core layer. In certain instances, however, when said cover layer, through which the recesses are to be provided, is a visible display surface, another approach may be desirable and preferable, in which the recesses are provided in the core layer prior to the completion of the sandwich panel, and the mounting insert is placed into, and adhesively bonded to, the core layer. Only then is the cover layer bonded to the core layer. This then only requires access through the cover layer, which can be provided in advance, for example, through providing a borehole in the position of a thread in the mounting insert, or subsequently, for example by providing a borehole in the position of the mounting insert so as to be able to utilize the mounting insert as intended.

A mounting insert according to the invention for installation into a lightweight sandwich panel, which is particularly suitable for inserting into and fixing in a lightweight sandwich panel according to the above described method, comprises a recessing section to enable a recessed placement into a recess in a structure in a lightweight sandwich panel. Said recessing section has in a first direction a longitudinal extension along which a first and a second face is provided at the end, where said faces are located opposite each other. The first end face of the recessing section of the mounting insert is bounded by a circumferential, plate-like collar, which extends in a transverse direction, transverse to the longitudinal direction, especially perpendicular thereto, which overhangs the recessing section that follows the collar. According to the invention the extension of the collar in transverse direction is at least 1.5 times the extension of the recessing section in said transverse direction. The extension of the collar may be in particular at least 1.8 times and, moreover, at least 2.0 times the extension of the recessing section in said transverse direction. According to the invention, the recessing section extends by the same amount in transverse direction towards the second end face, which is located opposite the first end face, or it extends in a tapered manner and ends at the second end face without further widening, or it has a heel with an extension in transverse direction of a maximum of 1.2 times the extension of the recessing section in transverse direction.

A mounting insert of this kind can be used in particular for implementing a method in which the circumferential collar forms the support section that is stated in this variation of the method, and where the edge of the recess is, with overlapping surfaces, adhesively bonded to the element of the lightweight sandwich panel (to the core layer or to one of the cover layers). If, as is proposed in one alternative, the mounting insert is provided with a heel at the second end face, said heel can serve as the lateral seal in the manner described previously by abutting a recess in the core layer of the lightweight sandwich panel in order to prevent the adhesive, which has been introduced into the space between the recessing section and the wall of the recess, from entering the space between the second end face and the base of the recess and filling up the air gap that should remain. The same as described above also applies in this instance, that for the purpose of defining a clear, cross-sectionally circular installation opening, a filler material is introduced into an opening that is larger than the recess, where said filler material is then provided with the actual recess. Such a step is, however, not necessarily required, especially if only a small amount of the adhesive penetrates the recess formed in the core layer due to the adhesive bonding technique, due the type of adhesive used and its surface application on the collar, and where it thereby only makes contact with a transition zone between the collar and the recessing section and bonds with the surrounding structure of the core layer, but is not able to penetrate to the base of the recess.

The essential part of the mounting insert according to the invention is that the circumferential collar forms the largest extension of the mounting insert in a transverse direction, especially perpendicular to the longitudinal extension of the recessing section, so that said circumferential collar rests on the edge of a recess, which is in the respective dimension and extension shorter, and where it can be surface-bonded with the material of the lightweight sandwich panel (may that be the surface of the core layer or the surface of a cover layer).

The mounting insert according to the invention may be provided with an internal thread, in particular in the recessing section, and the thread is oriented with its axis in the direction of the longitudinal extension and is accessible from the first end face.

For a subsequent connection of the lightweight sandwich panel, which is fitted with the mounting insert, to other elements, the respective mounting inserts and other connecting structures are often not located so exactly that the longitudinal axis of the internal thread lines up necessarily with a screw axis of a screw element that passes through a further component. Rather, manufacturing-related tolerances are usually present, especially if the mounting insert was fitted manually. In order to compensate for such tolerances, the internal thread may be advantageously formed in a threaded part, which is disposed in a mounting space that is formed inside the recessing section, and which is moveable inside the mounting space, relative to the recessing section, transverse to the direction of the longitudinal extension. To allow for corresponding tolerance compensation, the threaded part can be made moveable by comparatively short distances to different sides so that corresponding tolerances can be compensated for around a predetermined attachment point. Nevertheless, it is also possible that the mounting insert is deliberately formed with a slot-like, longitudinal travel so as to be able to hold a threaded part that can be relocated over longer distances in a preferred direction in an elongated mounting space. This creates a type of slot containing a moveable threaded part.

In an embodiment of the mounting insert according to the invention, as described above, with moveable threaded part, the threaded part may particularly also be moveable to a certain degree in longitudinal direction. Moreover, a cushioning element may advantageously be provided, which is arranged between an end face that closes the threaded part, and a boundary of the mounting space that is opposite said end face. There, said cushioning element is arranged in the direction of the longitudinal extension of the recessing section, that is, in the direction in which said section is inserted into the recess.

In particular, said cushioning element may be disposed on the longitudinal end of the threaded part that faces away from the first end face, between the threaded part and a base of the mounting space that faces the second end face. However, it is also possible to arrange the cushioning element on the opposite side, that is, on a longitudinal end of the threaded part that faces the first end face, between said threaded part and a cover of the mounting space opposite the base in longitudinal direction, as it is also possible to provide a cushioning element on each of both specified sides.

Said cushioning element may in particular be an elastic element. Such a cushioning element can fulfill various functions. Firstly, it is able to apply a certain amount of frictional force to the threaded part, which simplifies the positioning of the same for tolerance compensation in that the threaded part does not simply fall (back) again into another position due to insufficient friction, but retains the selected position due to the frictional force between the threaded part and the cushioning element. Secondly, such a cushioning element achieves a decoupling of the mounting insert and a fastener secured therein from impact forces, as they occur for example in aircraft due to suddenly occurring forces during takeoff and landing, or also due to tolerances, but also caused by vibrations of the engines. Based upon similar considerations, such cushioning effects, which the cushioning element provides, is also of importance in the boat and shipbuilding industry. Impact forces occur there as well due to the hull of the boat or ship impacting on the water's surface, but also due to vibrations caused by the ship's engines. In particular, by providing a "floating" arrangement of the threaded part in the mounting space, further narrow air gaps can be formed, that is, between the threaded part and the bottom of the mounting space or, respectively, if a cushioning element is provided, between the threaded part and the cushioning element as well as between the cushioning element and the base of the mounting space, which can lead to a further decoupling of the force transfer of a tensile force in the direction of the opposite panel side, and thus to a further improvement with regard to an efficient avoidance of the formation of dents.

A mounting insert as described above with a threaded part and an optional cushioning element may, particularly in the base of the mounting space, be provided with a vent hole. Such a vent hole can serve to establish a connection to the air gap, which remains between the base of the installation opening and the end of the recessing section facing said base when inserting the mounting element, in particular when adhesive is introduced into the space between the recessing section of the mounting insert and the installation opening.

In this respect it must be stressed, and it should be understood, that the above described design of a mounting insert with the moveable threaded part, which is located in the mounting space inside the recessing section, together with the possible advantageous designs thereof, can also be realized without the dimensioning of the collar with regard to its extension in transverse direction in comparison to the extension of the recessing section in transverse direction, and without the more accurate determination of the further route of the extension of the recessing section, and can contribute to a solution of the objective described at the outset. Particularly through the moveably arranged threaded part, and advantageously in particular also under inclusion of the cushioning element disposed between the threaded part and the base of the installation space, a mounting insert of this design can be fixed using the above described method according to the invention, and can safely be used in this manner for the securing of further elements, which provides a decoupling of the tensile forces in a way that avoids the formation of dents.

The mounting insert according to the invention may be provided with particularly at least one, preferably multiple, radially offset opening(s) that pass through the collar on the other side of the recessing section. It is possible, for example, to provide four of such openings that are 90° offset to each other. If the collar is adhesively bonded flat to a surface of the core layer or the surface of a cover layer of the lightweight sandwich panel, such openings allow excess adhesive to pass through and extend through the collar. Once the adhesive is cured, the adhesive pins that extend into said openings form an anti-twist lock, which prevents twisting of the mounting inserts around their longitudinal axis, said mounting inserts being formed rotationally symmetrical in particular in the direction of the longitudinal extension of the recessing section.

As already mentioned earlier, the mounting insert can have different designs. According to an advantageous design, the recessing section can be made in the form of a circular cylinder, and the collar may be circular in shape. Nevertheless, it is equally possible that the recessing section exhibits a greater length transverse to the direction of the longitudinal extension, which is the first transverse direction, than transverse to the direction of the longitudinal extension and extending transverse to the first transverse direction, which is the second transverse direction. An elongated mounting insert of such a design is excellently suited particularly for the formation of a slotted connection, which permits a great amount of freedom, especially when providing a structure with a moveable threaded part that is arranged in a mounting space, for tolerance compensation for the connection of different elements composed of lightweight sandwich panels.

BRIEF DESCRIPTION OF THE SEVERAL VIEWS OF THE DRAWINGS

Further advantages and characteristics of the invention become apparent from the following description of an exemplary embodiment by means of the attached drawings. Shown are in.

The figures show schematically possible exemplary embodiments and variations of the invention, not only in regard to possible variations of the method but also with regard to design variations of the mounting insert. The figures are not to be understood as complete designs drawn to scale, but rather they are sketches that serve to demonstrate the basic principles of the invention.

DETAILED DESCRIPTION

Figure 1:
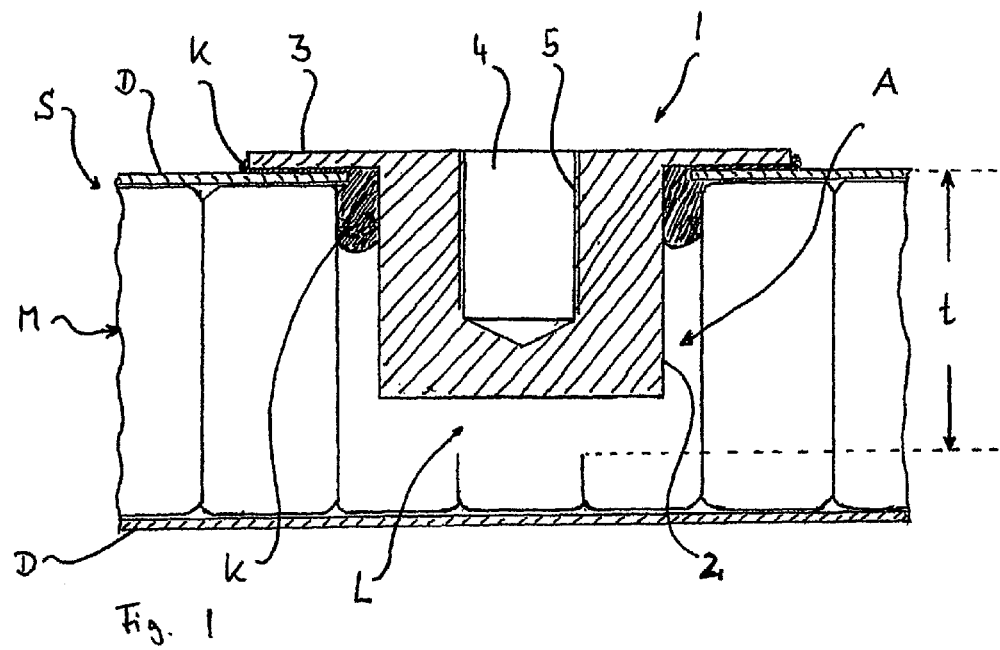
FIG. 1 a schematic cross-section of a mounting insert, inserted and fixed as per the method according to the invention, in a lightweight sandwich panel in a first design variation.

FIG. 1 shows a section of a lightweight sandwich panel S, where said lightweight sandwich panel S is formed by a core layer M, which constitutes the greater portion of the thickness, and the cover layers D applied to the main surfaces opposing each other. The core layer M is made in the form of a honeycomb structure; the cover layers D are adhesively bonded to the surfaces of the core layer M and may, for example, be decorative layers.

The lightweight sandwich panel S is provided with a recess A, which extends into a depth t of the material of the lightweight sandwich panel S, in particular into the material of the core layer M. A mounting insert 1 is inserted into recess A. Said mounting insert 1 sits with a recessing section 2 in recess A, in which the recessing section 2 is shorter than the depth t of the recess A, so that the mounting insert 1, inserted to the greatest possible depth with its recessing section 2 into recess A, does not reach the bottom or base respectively of recess A. Thus an air gap L remains between the bottom, or base respectively, of recess A and the part of the recessing section 2 that protrudes furthest into recess A.

The mounting insert 1 is provided on the end face, which opposes the end that protrudes into recess A, with a circumferential collar 3, which is disk-shaped. Said circumferential collar 3 has a diameter that is larger than the opening width of the recess A, so that the mounting insert 1 with the circumferential collar 3 rests, or more accurately rests with its underside, on the surface of the lightweight sandwich panel S, in this instance on a surface of cover layer D, which is shown in FIG. 1 at the top. As can be seen in FIG. 1, an adhesive K is applied to the underside of the circumferential collar or, respectively, to the top of the cover layer D, which is in contact with said collar 3. As shown in FIG. 1, said adhesive K has partly penetrated the side of recess A and connects there the circumferential lateral surface of the recessing section 2 of mounting insert 1 with the boundary of recess A. However, the adhesive K does not run down to the base of the recess A so that the air gap L in particular remains free of adhesive.

This particular type of bonding of the mounting insert 1 to the lightweight sandwich panel S, which is characterized in particular by a special choice of the adhesive K, which is on the one hand viscous but also cures quickly, so that, if it is applied to the surface of cover layer D or to the underside of collar 3 respectively and then flows into the annular space of recess A, it hardens and achieves a first sufficient strength before it reaches the bottom or base respectively of recess A, and so is not able to flow further to the base of recess A and possibly fill the air gap L.

As a result of the above described, particular fixing method of the mounting insert 1, a force decoupling of mounting insert 1 from the cover layer D, shown in FIG. 1 at the bottom, is achieved when tensile forces act upon the mounting insert 1. Such tensile forces occur in particular when a screw is inserted into borehole 4, which is shown in mounting insert 1 and is provided with a thread, for example for the purpose of connecting the lightweight sandwich panel S, which is fitted with the mounting insert 1, to another building element. This causes tensile forces that act in the direction of the thread axis of the internal thread 5, which, if they are transmitted from the mounting insert 1 to the cover layer D shown at the bottom in FIG. 1, lead to the formation of dents on this side, as known from the prior art. A force transmission of this kind takes place in the mounting method known from the is prior art, in which mounting inserts are adhesively bonded through complete filling of the recess A, including the structure of the sandwich panel S, where said layer of adhesive creates a force-transmitting bonding of the cover layer D, shown in FIG. 1 at the bottom, which causes the resulting formation of dents in said cover layer D.

In the mounting insert 1 depicted in FIG. 1, which forms in particular a rotationally symmetrical element around the thread axis of the internal thread 5, the diameter of the collar 3 may be in particular 1.5 times the diameter of the recessing section 2. The greater the forces that must be absorbed by mounting insert 1 the greater must be the diameter of collar 3, so that the ratio between the diameter of the collar 3 and the diameter of the recessing section 2 may be particularly at least 1.8 or even at least 2.0. However, there will be an upper limit since the collar 3 should not cover too large an area on the surface of the lightweight sandwich panel S. The upper limit in this instance is envisaged to be at a ratio of approximately 3:1 (diameter of collar 3 to diameter of the recessing section 2).

Incidentally and subsequently, the formation of dents is additionally prevented in that—different to the prior art where a bonding of the mounting insert 1 via the surface of cover layer D, which is penetrated by recess A, does not take place—in this instance the adhesive bonding of the collar 3 with the cover layer D, which is adjacent to the opening of recess A, is planned. As a result of the adhesive bonding of the surface, part of the acting tensile forces are diverted in the direction of the flat extension of the collar 3 and of the adhesive bonding in this direction, that is, in a direction perpendicular to the thread axis, hence the diverted force is of course no longer able to contribute to the formation of dents discussed above.

Figure 2:
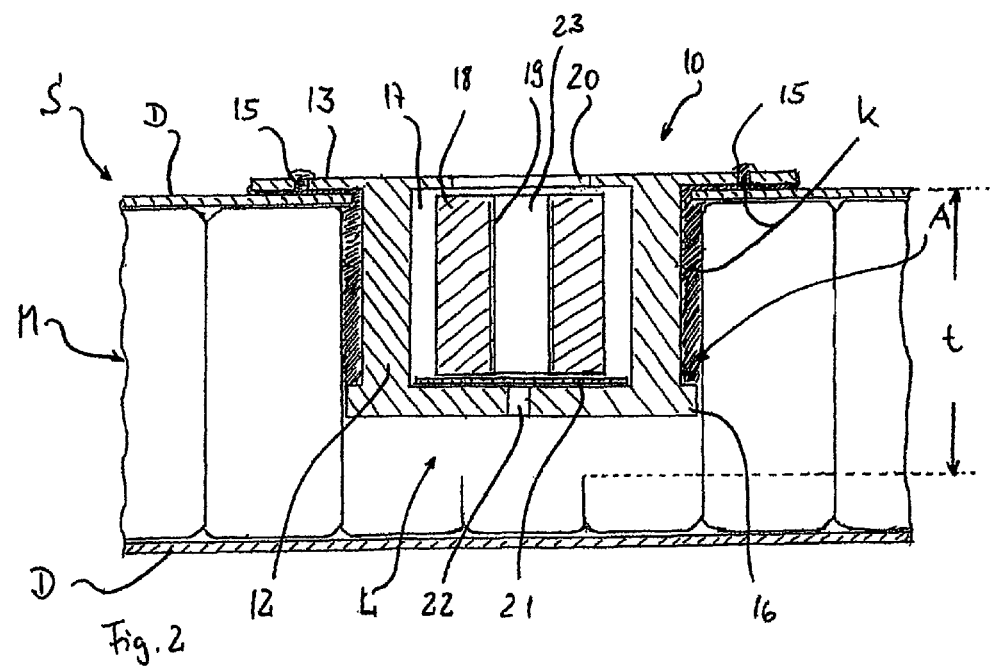
FIG. 2 a schematic representation similar to that of FIG. 1, depicting a mounting insert in a second design variation, inserted and fixed in a lightweight sandwich panel.

The representation in FIG. 2, which is similar to that of FIG. 1, shows a mounting insert 10 that is inserted, following the method according to the invention, into a lightweight sandwich panel S. As before, the lightweight sandwich panel S is depicted consisting of a core layer M (again a honeycomb layer) and two cover layers D that are applied to the opposing main surfaces of said core layer M. In conforming with the method according to the invention, a recess A is again first provided in the lightweight sandwich panel S, in particular into the core layer M to the depth t, up to the base of the recess A. The mounting insert 10 with a recessing section 12 is inserted into said recess, where the recessing section 12 extends less deep in inserting direction than the depth t of recess A, so that again an air gap L remains between the base of recess A and the end face of recessing section 12 that points towards said base.

The mounting insert 10 shown here is also provided with a circumferential collar 13 that is formed on the end face that is opposite to the end face that points toward the base of recess A and has a larger diameter, or greater dimensions respectively, than the opening width of recess A with the above described size ratios, which are also applicable for this exemplary embodiment.

A first deviation and special feature of the mounting insert 10 compared to the mounting insert 1 of the previous figure are the through holes 15 that are provided in collar 13. These serve to provide a rotationally locked fixing of mounting insert 10 in recess A in a manner that will be described later.

Furthermore, a heel 16 is shown on the end face that points towards the base of recess A, said heel 16 being formed in that recessing section 12 has a larger diameter in this section. The diameter of the recessing section 12 in the area of the heel 16 is made to approximately match the opening width of recess A, so that when recessing section 12 is inserted into recess A, the heel 16 forms a more or less tightly sealed connection to the edge of recess A.

While the mounting insert 1 in FIG. 1 is solid, comprising a borehole 4 with an internal thread 5 therein, the mounting insert 10 of FIG. 2 shows a mounting space 17, which has an opening 20 that points upwards in FIG. 2. A threaded part 18 in the form of a threaded sleeve is inserted into the mounting space, and is in this space moveable relative to the recessing section 12, particularly in lateral direction. Said threaded sleeve features an internal thread 19 in a central borehole 23. A cushioning element 21 is disposed at the base of mounting space 17, which may, for example, be made of rubber, and which is able to elastically decouple impact forces that act on the threaded part 18 from the remaining part of mounting insert 10, and in the opposite direction. Moreover, a vent hole 22 can be seen in the end face that points towards the base of recess A, through which the air from air gap L can flow into the mounting space 17, and from there is able to discharge via the opening 20 (or in the other direction). Said vent hole is provided so that the air, which has been displaced when the adhesive enters a space between the recessing section 12 and the outside of recess A, can escape.

The mounting insert 10 shown in FIG. 2 is also fixed with adhesive K in the recess A. The adhesive K is not only applied between the sections of collar 13, which extend past the cover layer D on the side of the lightweight sandwich panel S shown at the top in FIG. 2, and the cover layer D in this area, but extends also deeper down into a gap or annular space between the outside of recess A and the recessing section 12. However, the space which the adhesive K penetrates, or has penetrated respectively, is bounded by heel 16, so that the adhesive K does not penetrate the space of air gap L, keeping air gap L intact.

This design again achieves the already above described method of decoupling between the mounting insert 10 and the cover layer D, shown at the bottom of FIG. 2, so that if a tensile force is applied and acts upon the mounting insert 10 in the direction of the longitudinal axis of the internal thread 19, said tensile force is not transmitted to the lower cover layer D, thus preventing the formation of dents. The advantage of the threaded part 18 being moveable inside mounting space 17 is that it allows the position of the thread 19 to be changed and corresponding tolerances can be compensated in this manner. Moreover, the cushioning element 21 causes a certain amount of friction between threaded part 18 and said cushioning element 21, so that a set position of the threaded part 18, and thus that of the internal thread 19, is not lost by the threaded part 18 in the mounting space 17 falling freely back into a different position.

As shown in FIG. 2, the adhesive K has also passed through the through holes 15 and is forming adhesive pins. These cause a positive-locking connection with the through holes, of which four in total can be provided, 90° offset to each other, and thus forming an anti-twist lock of the mounting insert 10.

The mounting insert shown in FIG. 2 can be a rotationally symmetrical body, formed around the thread axis of the internal thread 19. Nevertheless, it may also be made in the form of an elongated mounting insert that exhibits a greater extension in the direction of the depth of the drawing sheet than the extension shown in the drawing plane. As such the opening 20 is made in the form of a slot, and the thread part 18 can be moved along said slot. It is also conceivable to provide two or more threaded parts in one such slot to be able to facilitate multiple screw connections with one mounting insert for a lightweight sandwich panel fitted with a corresponding mounting insert.

Figure 3:
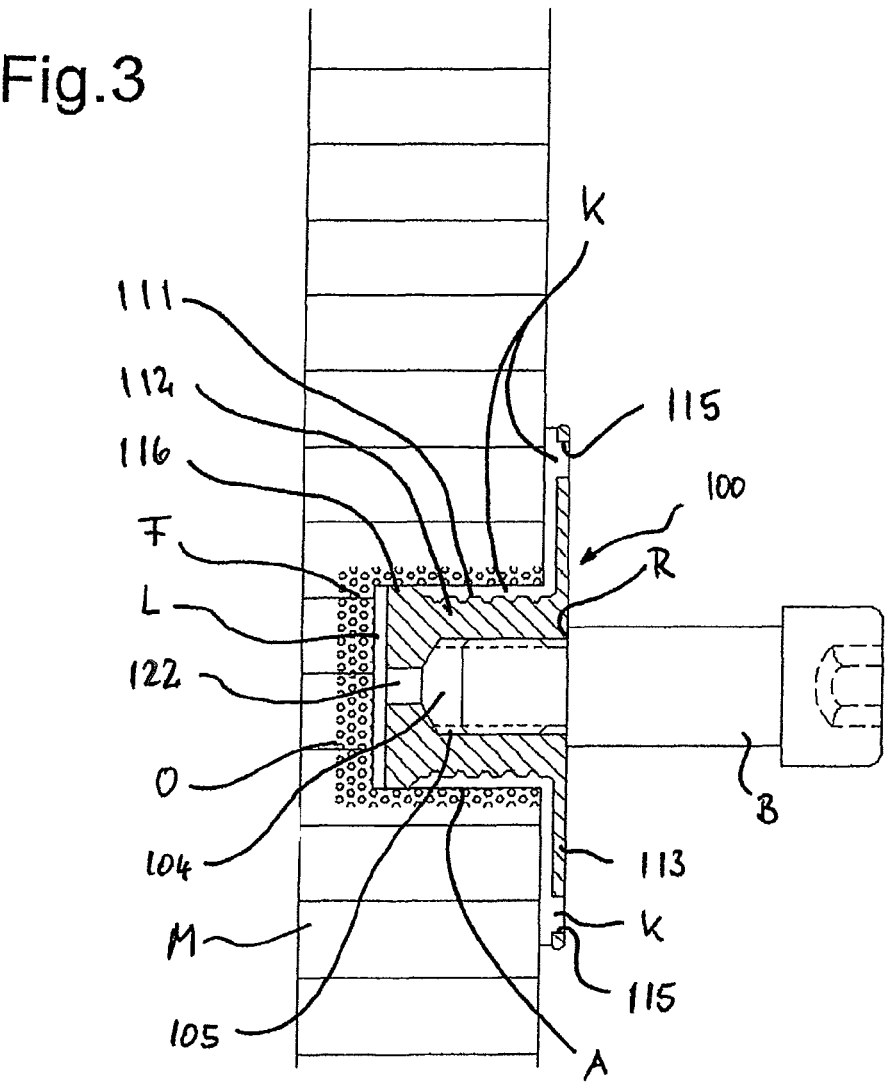
FIG. 3 a schematic cross-section of a mounting insert, inserted and fixed as per the method according to the invention, in a lightweight sandwich panel in a third design variation.

FIG. 3 shows a further example of a mounting insert 100 that is designed according to the invention and fixed according to a variation of the method according to the invention. It is also provided with recessing section 112 with which it is inserted into a recess A. In contrast to previous exemplary embodiments, the recess A is not provided directly into the material of the lightweight sandwich panel, but an opening O is formed into the material of the lightweight sandwich panel first and then filled with a filler material F that is in this instance porous when cured. The recess A is then provided into said filler material F through material removal. Furthermore, the lightweight sandwich panel shown in FIG. 3 does not constitute the complete panel, but shows the core layer M only. In this variation the opening O and the recess A are provided in the core layer M, and the mounting insert 100 has been inserted into recess A before the cover layers are applied to the core layer M to complete the lightweight sandwich panel. It can also be seen that in this instance the opening O extends through the entire thickness of the core layer M. Alternatively, the opening O may also be formed as a "blind hole".

The mounting insert placed into recess A with its recessing section 112 also has, as in previously shown exemplary embodiments, a circumferential collar 113, which is located at the end opposite the recessing section 112. Said collar 113 rests on the surface of the core layer and projects beyond the edge of recess A. Through holes 115 are formed in collar 113. The recessing section 12 is provided with a heel 116, which is located at the end opposite the collar 113 in longitudinal direction, where the heel part of the diameter of the recessing section is enlarged compared to the diameter extending from the heel 116 towards the collar 113, but is smaller compared to the diameter of collar 113.

A corrugation 111, which enlarges the surface, is formed on the circumferential surface of recessing section 112.

A borehole 104 with an internal thread 105 is provided in longitudinal direction of mounting insert 100. In this drawing the internal thread is shown with a bolt B fully screwed in. Said bolt features a step R at the transition between a threaded section, with which it is screwed into the internal thread 105, and the threadless neck section. When fully screwed in, said step R is in contact with the collar 113 of mounting insert 100. The infusion of torque and tensile force into the upper side of the collar 113 is achieved as a result of the design and the special configuration of the bolt. This leads to a good discharge of the torque in particular to the collar and thus in the direction parallel to the main extension of the core layer M of the lightweight sandwich panel.

A vent hole 122 can be seen at the base of borehole 104, which passes through the end face into the direction of the base of recess A and creates a connection between an air gap L, which is deliberately formed between the base of recess A and the end face of recessing section 112 that is located at the front-most part of said recess A, and the inside of borehole 104.

As in the previous exemplary embodiments, the mounting insert 100 is fixed inside recess A with adhesive K, which, in a section between the collar 113 and the heel 116, fills out the circumferential space between the filler material F and the recessing section 112, and said adhesive K is also applied between the surface of the core layer M and the surface of collar 113 that faces it. The adhesive K is able to penetrate the pores of the filler material F, thus gripping particularly well, in which the filler material F opposite the heel 116 forms a tight barrier that prevents the ingress of the adhesive K into the space between the base of recess A and the end face of recessing section 112 that points towards said base and thus guarantees the air gap L, which ensures the decoupling, in the manner described above, of the tensile forces applied by bolt B from the side of the core layer M that is located opposite collar 113, and thus avoids the undesired formation of dents.

Moreover, it can also be observed that the adhesive K penetrates the through holes 115 and in this way creates an anti-twist lock, as described in the exemplary embodiment according to FIG. 2.

Figure 4:
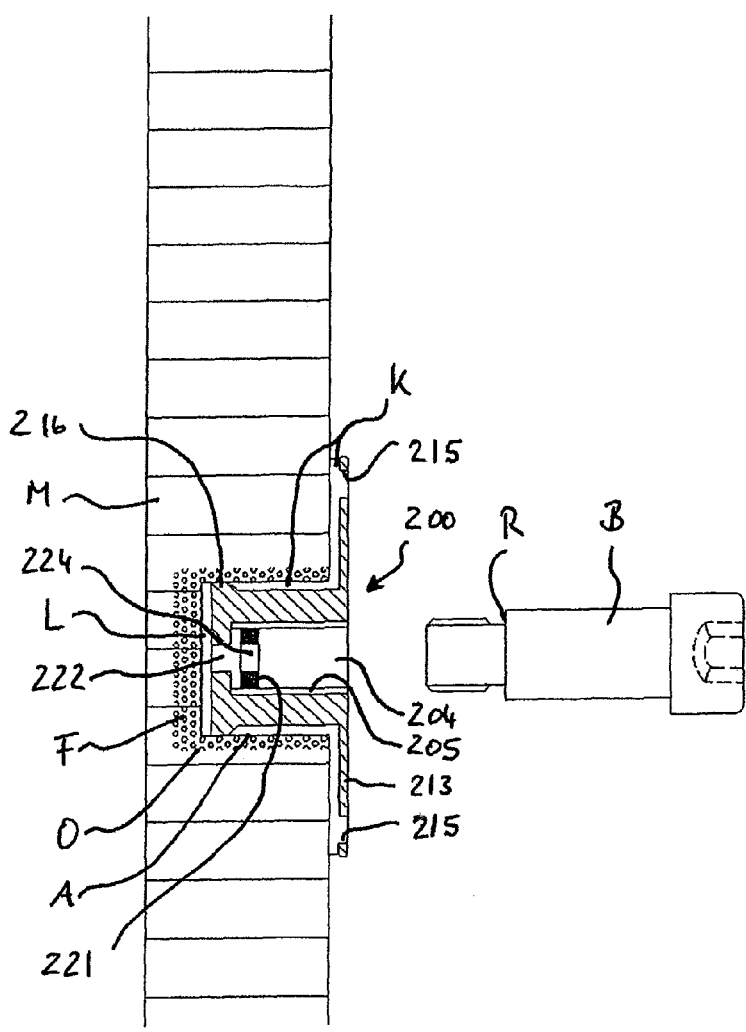
FIG. 4 a schematic cross-section of a mounting insert, inserted and fixed as per the method according to the invention, in a lightweight sandwich panel in a fourth design variation.

FIG. 4 shows a further exemplary embodiment for a mounting insert 200, which essentially corresponds to the design of the exemplary embodiment shown in FIG. 3. The structures that are each identified starting with "1" in their three-digit reference numbers, have in the exemplary embodiment of FIG. 4 a three-digit reference number that starts with "2". The design and function of the structures and elements correspond to those of the exemplary embodiment in FIG. 3, so that reference is made to the previous description for an explanation thereof. The essential difference in this instance is that additional cushioning elements 221 are arranged in opening 204, which, similar to the cushioning element 21 described in the exemplary embodiment of FIG. 2, provides further decoupling, in particular of impact forces applied to bolt B. Like cushioning element 21, the cushioning element 221 is made from an elastic material, for example rubber. This exemplary embodiment shows that the cushioning element 221 is provided with a vent hole 224. The purpose of this is to create a venting connection of borehole 204 with air gap L through the two vent holes 222 and 224. This design allows the formation of further (interactively communicating) air gaps, in addition to air gap L, between the base of borehole 204 and the cushioning element 221 as well as between the end face of bolt B inserted into borehole 204 and the cushioning element, which ensure a further improved decoupling of the described tensile forces.

A vent hole similar to the vent hole 224 may also be provided in the cushioning element 21 of the exemplary embodiment according to FIG. 2.

Like mounting insert 100 according to FIG. 3, mounting insert 200 is also fixed into an opening O made previously into a filler material F. The above description can also be referenced in this respect.

Figure 5:
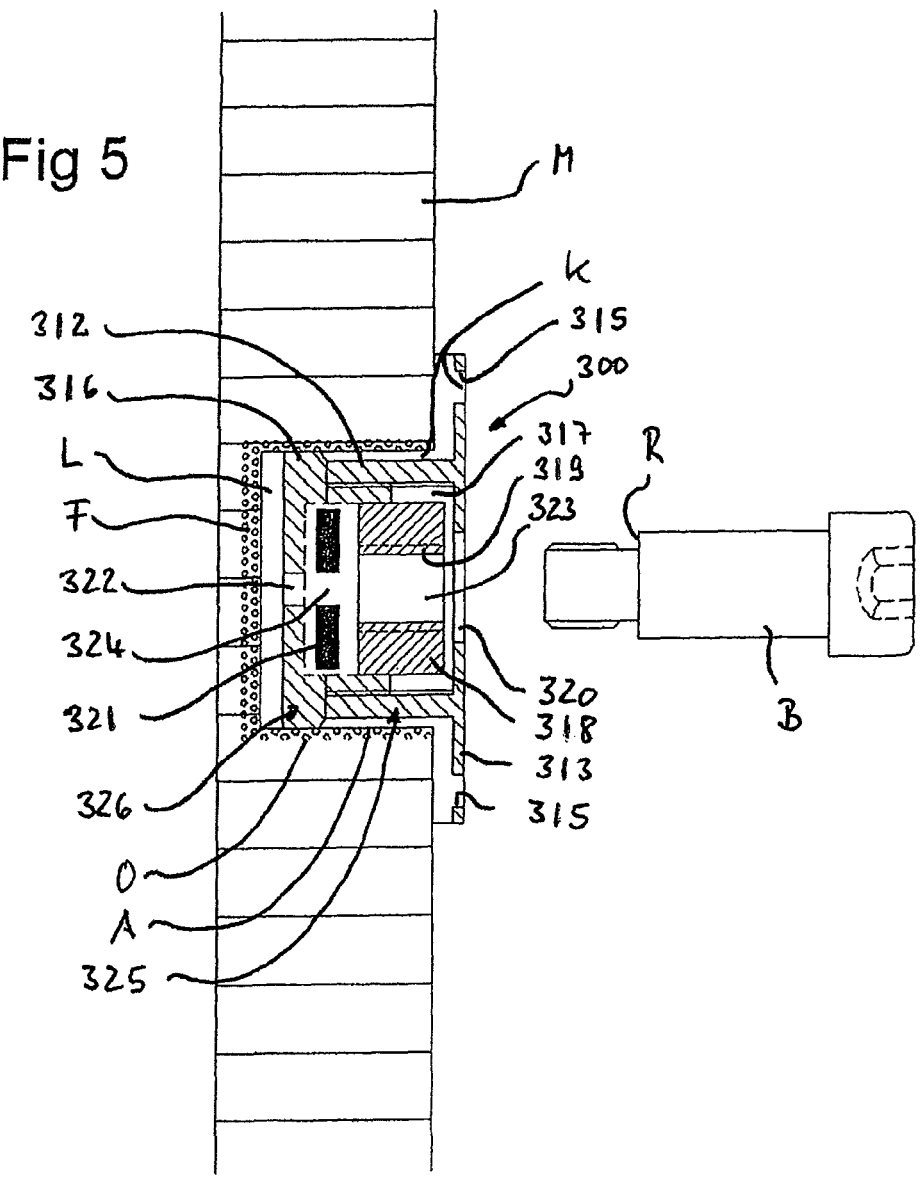
FIG. 5 a schematic cross-section of a mounting insert, inserted and fixed as per the method according to the invention, in a lightweight sandwich panel in a fifth design variation.

Lastly, in FIG. 5 a last exemplary embodiment of a mounting insert 300 is shown. The design of this insert is essentially the same as that of the mounting insert of FIG. 2, in which parts and structures of mounting insert 300 are identified with reference numbers that are comparable to the corresponding parts and structures of mounting insert 10 as per FIG. 2, with the difference that each is prefixed with the number "3". Thus the recessing section 312 corresponds to recessing section 12 of mounting insert 10, the collar 313 to collar 13 etc. Regarding the description of mounting insert 300, reference is made to the description of mounting insert 10, but the reader should mentally add the prefix "3" to each reference number.

The only differences between the mounting insert 300 and the mounting insert 10 are firstly the vent hole 324 in cushioning element 321, which is similar to the vent hole 224 in the exemplary embodiment according to FIG. 4 and serves the same purposes, and secondly the type of fixing in the lightweight sandwich panel, which has occurred also in this instance, like in the examples according to FIGS. 3 and 4, in that a filler material F has first been filled into an initially prepared opening O, into which the recess A was formed.

It is also apparent from FIG. 5 that the mounting insert 300 is, for installation reasons, assembled from two parts screwed together (this is also preferred for the mounting insert 10 according to FIG. 2), a sleeve 325 that forms the collar 313 as well as a further part of the recessing section 312, and a cap 326 that forms the end part of the recessing section 312 and which is located opposite collar 313 in longitudinal direction and comprises the heel 316, which, in order to attach it, can be screwed into sleeve 325 or fixed to it in some other way. Due to this two-part design it is possible, during assembly, to arrange the individual components of threaded part 318 and cushioning element 321 in the mounting space 317.

Figure 6:
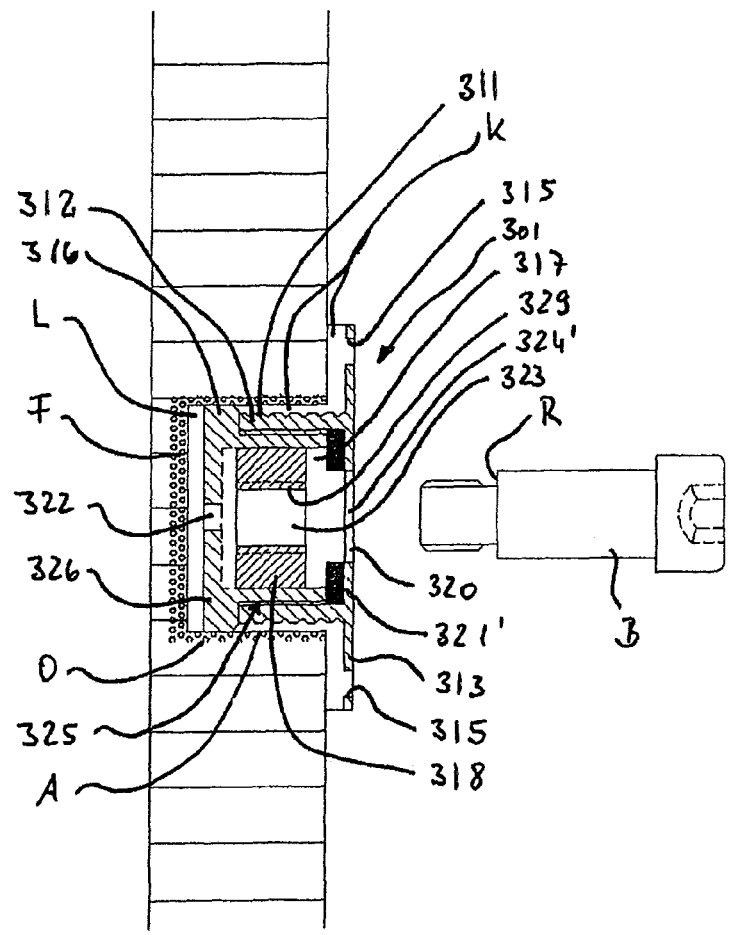
FIG. 6 a schematic cross-section of a mounting insert that is designed largely like that shown in FIG. 5, with a cushioning element disposed at a different location, and with a corrugation on the outside of the recessing section.

FIG. 6 shows a mounting insert 301, which is to a large extent identical to the mounting insert 300 and is fixed in the same way into the lightweight sandwich panel, in particular in its core layer M. As far as identical reference numbers are used in FIG. 6, the same applies as in FIG. 5 where they are used to identify identical parts and structures. Thus please refer to the above description of FIG. 5 regarding design and function. The only differences between the mounting insert 300 according to FIG. 5 and the mounting insert 301 according to FIG. 6 are that, firstly, the outside of the recessing section 312, which is smooth in the recessing section 312 of mounting insert 300, is provided with a corrugation 311 in mounting insert 301, which is comparable in structure and effect to corrugation 111 in the example shown in FIG. 3. Secondly, the arrangement of cushioning element 321 in FIG. 5 and 321' in FIG. 6 is different. While the cushioning element 321 in FIG. 5 is shown at the base of mounting space 317, the cushioning element 321' in mounting insert 301 of FIG. 6 is located on the opposite side, at the end of the mounting space 317 that faces bolt B. Correspondingly, the opening 324' in cushioning element 321' is also made larger to let the bolt B with its threaded section pass through; it is not made to serve as a vent hole, like the opening 324 in cushioning element 321 of mounting insert 300.

Figure 7:
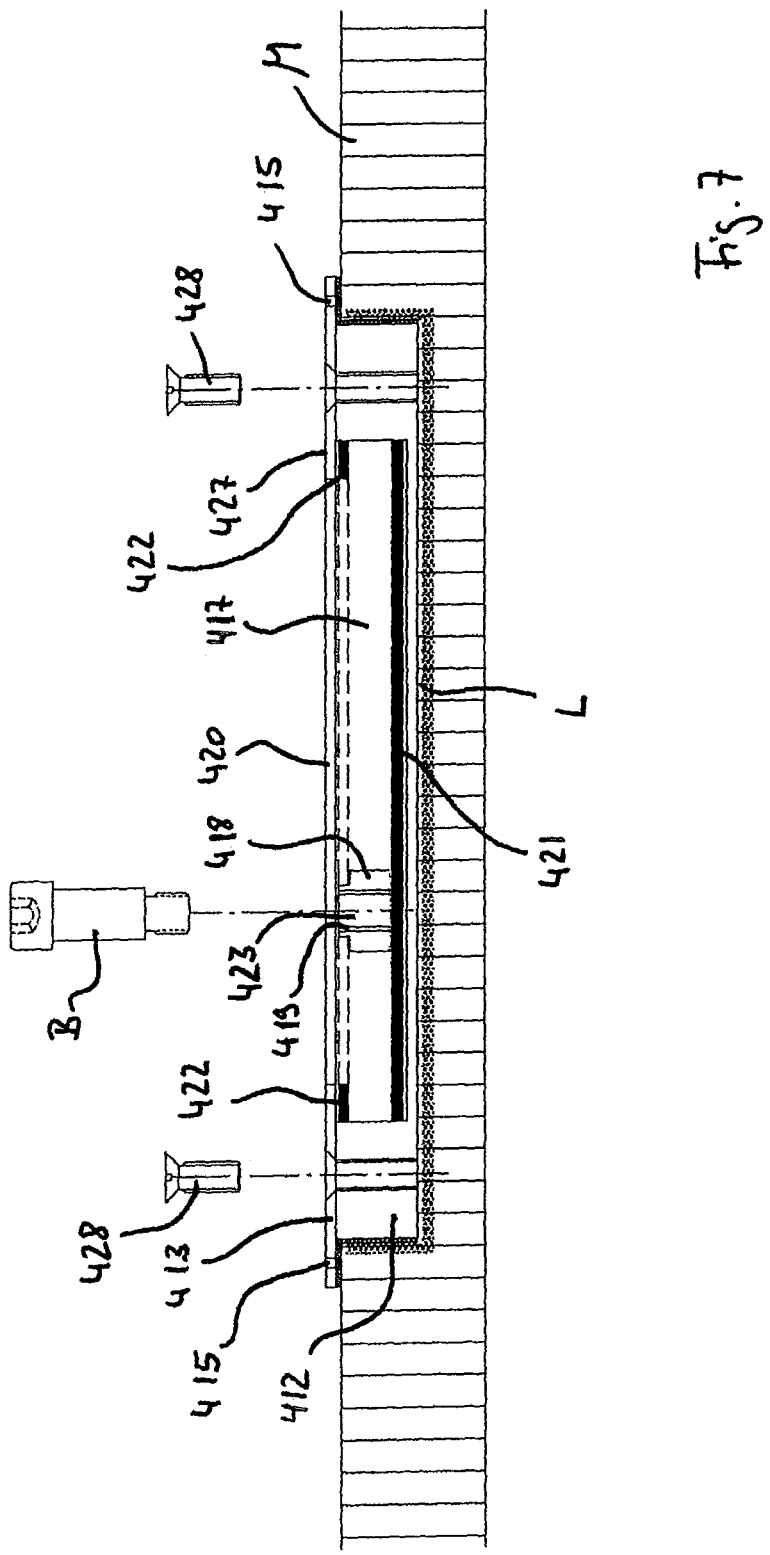
FIG. 7 a schematic cross-section of a further exemplary embodiment of a mounting insert, inserted and fixed as per the method according to the invention, and FIG. 8 a schematic representation of the method for the inserting and fixing of a mounting insert according to the invention in four steps in a possible exemplary embodiment.

Finally, FIG. 7 depicts a design variation in which the mounting insert 400 is elongated, providing an elongated mounting space 417 formed in its recessing section 412. Analogously to the threaded parts in previously shown exemplary embodiments, a threaded part 418 is disposed in said mounting space 417, which is provided with a cover plate 427 (shown at the top in the drawing) that is attached to the body of mounting insert 400 by means of screws 428. Said threaded part 418 is moveable in the longitudinal direction of mounting space 417, which in FIG. 7 is shown in direction from left to right, but is guided in a direction transverse to the drawing plane since the mounting space 417 is only fractionally wider than the width of the threaded part 418 in this direction. The threaded insert 418 is, again, provided with a borehole 423 with an internal thread 419. The cover plate is provided with a slot-like opening 420, through which the bolt B is screwed into the internal thread 419. Because the threaded part 418 can be moved in longitudinal direction, the connection point of the screw connection can be adjusted, for example for reasons of tolerance compensation. Cushioning elements 421 and 422 are located at the base of mounting space 417 and at its top, so that the threaded part 418 rests on both sides (top and bottom) against a respective cushioning element 421 and 422.

The mounting insert 413 [sic] has also in this instance a circumferential collar 413, in which through holes 415 are provided. The mounting insert 400 is also fixed with adhesive into a recess in the core layer M of the lightweight sandwich panel in such a manner that an air gap L remains between the recessing section 412 and the base of the recess. This also achieves the above described advantages.

The characteristics specifically highlighted in the above described exemplary embodiments may be combined among each other and varied. For example, the mounting insert 1 according to FIG. 1 may be provided with through holes 15 in its collar 3 in the same manner as they are shown in mounting inserts of the other exemplary embodiments. Furthermore, the mounting insert 1 may have a heel 16, like the mounting inserts of the other exemplary embodiments, so as to form an end stop or support respectively for the inflowing adhesive, which penetrates the space between the recessing section 2 and the outer wall of recess A. It is also possible that the mounting insert 10 and the mounting inserts of the other exemplary embodiments are each made without a heel, and are fixed and adhesively bonded as shown in FIG. 1 and described by way of this drawing. Significant for the method according to the invention and for the avoidance of the formation of dents is the air gap L. It must be ensured, through the approach used and through the choice of a suitable adhesive as well as through a suitable geometry of the mounting insert, that the air gap L is not filled with adhesive K. To fix the mounting inserts shown in FIGS. 1 and 2 it is also possible to first provide openings O, fill them with filler material F and then form the recess into said filler material F, like the embodiments shown in FIGS. 3 to 6 in a way that is shown in FIGS. 1 and 2, that is, without the application of filler material F first, and insert said mounting inserts into the recess A, which is formed directly into the core layer M, and anchor them there.

Lastly, it should also be noted that it is possible to place the mounting inserts 1 or 10 respectively, or variations thereof, into the core layer M before the cover layer D, shown at the top in the drawings, is laminated onto the core layer M (similar to the method indicated in FIGS. 3 to 7). This method is able to produce a "recessed" installation of the mounting insert 1 or 10 respectively. The cover layer D is subsequently placed on top of the core layer M and the mounting insert 1, or 10 respectively, which is mounted therein. The cover layer D may already be provided with an opening through which the internal thread 5 or 19 respectively can be reached. Alternatively, the cover layer D may also be placed over the entire mounting insert 1, or 10 respectively, where in this instance the borehole 4 or the opening 20 respectively is first covered, for example with a film or a wax paper or similar. Through a corresponding mark or a transparent cover it is possible to recognize later as to where the borehole 4 or the opening 20 respectively is located. The cover layer can be opened carefully and with a suitable tool, for example a drill, up to the paper or film respectively that covers the borehole 4 or the opening 20 respectively, and this paper or film respectively can be penetrated to provide access to the internal thread 5 or 19 respectively. Such a covered installation method is of particular advantage when the side of the lightweight sandwich panel S with the cover layer D, shown at the top in the drawings, later forms a visible surface.

Moreover, surface-enlarging profiles such as corrugations 111 or 311 may also be used in those design variations that are shown with a smooth outer side of the recessing section, but such profiles may also be formed in other implementations of the invention. Profiles of this kind generally have the advantage of providing improved circumferential grip of the recessing section.

It should also be noted that the heel of the mounting inserts in FIGS. 2 to 6 have a lateral extension, or diameter respectively, which is in particular a maximum of 1.2 times the diameter of the remaining recessing section 12.

Figure 8:
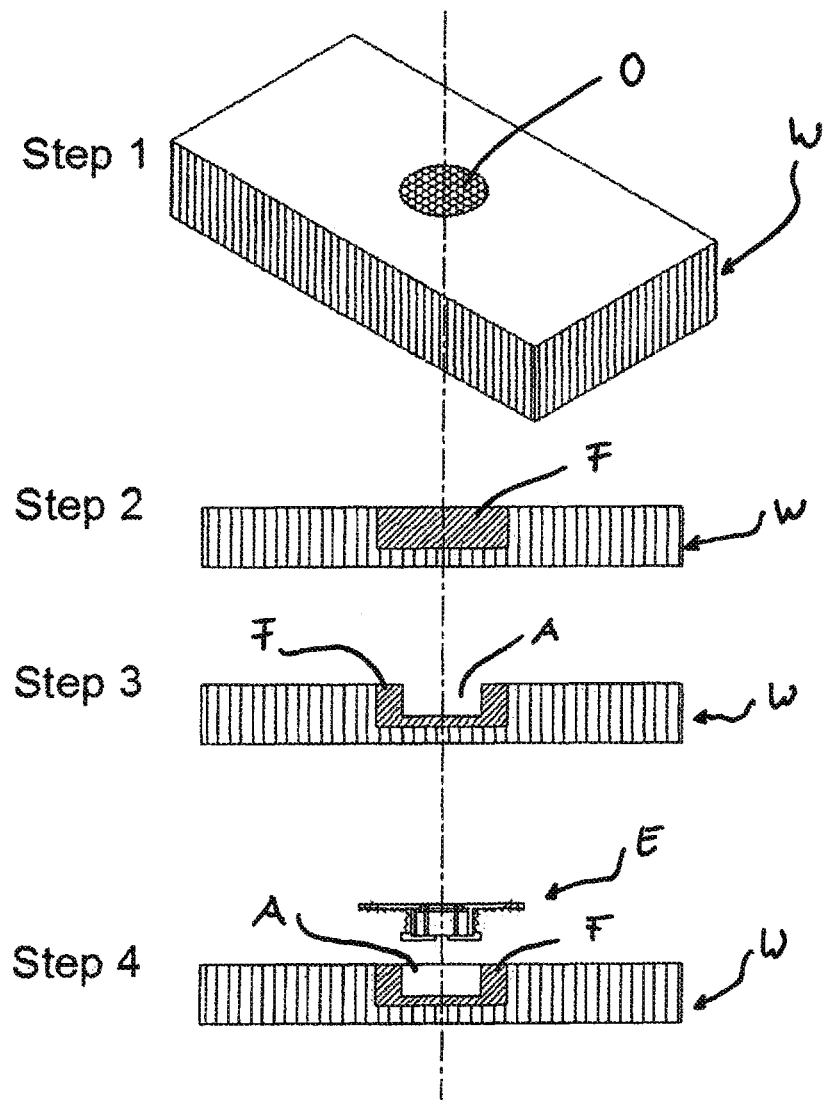

The FIG. 8, finally, depicts schematically in four steps the process of inserting a mounting insert E into the honeycomb structure W of a sandwich panel according to a preferred method of one possible exemplary embodiment. In a first step, an opening O is provided from one surface of the honeycomb structure W into the depth of the honeycomb structure W, but without fully penetrating it. In a second step, said opening is filled with a filler material F, which later forms the basis for the anchoring of the mounting insert. Said filler material F may in particular be a porous curing material, for example curing foam such as PU foam. Such a porously curing filler material provides good anchorage for the adhesive that will be applied in a next step.

In the third step, a recess A is formed into the filler material F as soon as it is cured, in particular through drilling. The recess A forms a blind hole and extends less deep into the honeycomb structure W than the opening O, and is in its diameter smaller than the opening O, so that the recess A is surrounded by filler material F not only at its bottom but also laterally.

In a fourth step, a mounting insert E is placed into recess A and is fixed there with an adhesive, for example a resin adhesive, in such a manner that an air gap remains between the underside of the mounting insert E that faces the base of recess A, and recess A itself. The mounting insert E is fixed in the manner according to the invention as soon as the adhesive is cured. Provided that the honeycomb structure W did not have a cover layer, such a cover layer can now be applied, into which then a borehole is to be provided that aligns with the threaded borehole in mounting insert E, for example with a threaded part provided in mounting insert E, so that a bolt can be inserted into the threaded borehole and secured therein.

The significant advantages of the invention have been highlighted again in the above description and explanation of the exemplary embodiments. The exemplary embodiments, which will be described in the following claims, are not meant to limit the invention, but simply serve as an aid to better explain and illustrate it.

LIST OF REFERENCE NUMBERS 1 mounting insert
2 recessing section
3 collar
4 borehole
5 internal thread
10 mounting insert
12 recessing section
13 collar
15 through hole
16 heel
17 mounting space
18 threaded part
19 internal thread
20 opening
21 cushioning element
22 vent hole
23 borehole
100 mounting insert
104 borehole
105 internal thread
111 corrugation
112 recessing section
113 collar
115 through hole
116 heel
122 vent hole
200 mounting insert
204 borehole
205 internal thread
212 recessing section
213 collar
215 through hole
216 heel
221 cushioning element
222 vent hole
224 vent hole
300 mounting insert
301 mounting insert
311 corrugation
312 recessing section
313 collar
315 through hole
316 heel
317 mounting space
318 threaded part
319 internal thread
320 opening
321 cushioning element
321' cushioning element
322 vent hole
323 borehole
324 vent hole
324' opening
325 sleeve
326 cap
400 mounting insert
412 recessing section
413 collar
415 through hole
417 mounting space
418 threaded part
419 internal thread
420 opening
421 cushioning element
422 cushioning element
423 borehole
427 cover plate
428 screw
A recess
B bolt
D cover layer
E mounting insert
F filler material
K adhesive
L air gap
M core layer
O opening
R step
S lightweight sandwich panel
W honeycomb structure
t depth

The invention claimed is:

1. A method for inserting and fixing a mounting insert into a lightweight sandwich panel by means of an adhesive bonding technique, said method comprising the steps of:
   providing said lightweight sandwich panel comprising a core layer having a first surface and an opposed second surface; and two cover layers, wherein each cover layer is applied to a different one of the first and second surfaces;
   providing said mounting insert; wherein said mounting insert includes a recessing section;
   removing material from the core layer of the lightweight sandwich panel to form an opening therein; wherein the opening has a depth that extends into a depth of the core layer such that the depth of the core layer is greater than the depth of the opening and a region of the core layer remains between a bottom of the opening and the cover layer applied to the second surface;
   filling the opening with a filler material;
   bonding the filler material to the lightweight sandwich panel that bounds the opening;
   subsequently removing material from the filler material to form a recess in said filler material, the recess having a depth less than the depth of the filler material;
   inserting the recessing section of the mounting insert into the recess defined in the filler material in the lightweight sandwich panel; wherein an end face of the recessing section is opposed to the bottom of the recess;
   defining an air gap between the end face of the recessing section and the bottom of the recess;
   adhesively bonding the mounting insert to the lightweight sandwich panel, wherein no adhesive is placed into the air gap.

2. The method according to claim 1, further comprising providing a support section on the mounting insert;
   wherein the support section has a lateral extension in a transverse direction, transverse to a longitudinal extension of the recessing section, and the lateral extension is greater than an extension of the recessing section in the transverse direction, and the lateral section is also greater than the extension of the recess in said transverse direction;
      placing the support section on the cover layer applied to the first surface of the lightweight sandwich layer when the recessing section is inserted into the recess;
      surface-bonding the support section to the cover layer applied to the first surface or to the core layer.

3. The method according to claim 1, wherein the recess is formed in the core layer and the mounting insert is adhesively bonded to the core layer before a cover layer is applied to the first surface of the core layer, and that, subsequently, the cover layer is applied to the first surface of the core layer and is bonded to the core layer.

4. The method according to claim 1, wherein the core layer has a honeycomb structure.

5. The method according to claim 1, wherein the filler material used is a porous curing material.

6. A mounting insert for installation into a lightweight sandwich panel, said mounting insert comprising:
   a recessing section for recessed insertion into a recess defined in the lightweight sandwich panel, wherein the recessing section has a longitudinal extension in a first direction;
   a collar is formed and continues from a first end face of said recessing section, said collar being shaped as a circumferential plate that extends in a direction transverse to the longitudinal extension; said collar overhanging the recessing section; wherein the extension of the collar in the transverse direction is at least 1.5 times an extension of the recessing section in the transverse direction, and
   wherein the recessing section includes a second end face that is located opposite the first end face; and the second end face has a uniform extension in the transverse direction or tapers in the transverse direction, or the second end face does not increase in extension in the transverse direction or ends with a heel, the extension of which in the transverse direction is at most 1.2 times the extension of the recessing section in the transverse direction;
   wherein the recessing section is provided with an internal thread that is oriented with a thread axis in the direction of longitudinal extension and is accessible from the first end face;
   wherein the internal thread is formed in a threaded part inside a mounting space that is formed inside the recessing section, and wherein said threaded part is arranged moveable relative to the mounting space; and
   an elastic cushioning element that is disposed between the threaded part and a wall of the mounting space that delimits the mounting space in the direction of longitudinal extension.

7. The mounting insert according to claim 6, further comprising a vent hole defined in a base of the mounting space.

8. The mounting insert according to claim 6, further comprising at least one radially offset through hole(s) that is provided in the collar.

9. The mounting insert according to claim 6 wherein the recessing section takes the form of a circular cylinder, and wherein the collar is circular.

10. The mounting insert according to claim 6, wherein the recessing section has a greater length in a first transverse direction that extends transverse to the direction of the longitudinal extension than in a second transverse direction that extends transverse to the direction of the longitudinal extension and transverse to the first transverse direction.

11. The mounting insert according to claim 8, comprising multiple radially offset through holes that are provided in the collar.

12. The mounting insert defined in claim 6, wherein the collar is perpendicular to the recessing section.

13. A mounting insert for installation in a lightweight sandwich panel, wherein the mounting insert comprises:
   a recessing section for the recessed insertion into a recess defined in the lightweight sandwich panel; wherein the recessing section is longitudinally extended in a first direction; wherein a mounting space is formed in the recessing section, and
   a threaded part is arranged moveably in the mounting space transverse to the direction of the longitudinal extension; wherein said threaded part is provided with an internal thread that is oriented with a thread axis in the direction of longitudinal extension of the mounting insert and is accessible from a first end face of the recessed section; and
   an elastic cushioning element is disposed between the threaded part and a wall of the mounting space that bounds the mounting space in the direction of longitudinal extension.

* * * * *